US012762095B2

(12) United States Patent
Fernalld et al.

(10) Patent No.: US 12,762,095 B2
(45) Date of Patent: Oct. 13, 2026

(54) SYSTEMS AND METHODS FOR CUSTOMER DEFINED ATTRIBUTES

(71) Applicant: Nextworld, LLC, Greenwood Village, CO (US)

(72) Inventors: Victoria Fernalld, Greenwood Village, CO (US); Sally Jane Stern, Greenwood Village, CO (US); Cheyanne Miller, Englewood, CO (US); Joseph Graff, Greenwood Village, CO (US); Bruce Clounie, Greenwood Village, CO (US); Kendra Barton, Parker, CO (US); Robert Keefer, Denver, CO (US)

(73) Assignee: Nextworld, LLC, Greenwood Village, CO (US)

( * ) Notice: Subject to any disclaimer, the term of this patent is extended or adjusted under 35 U.S.C. 154(b) by 0 days.

(21) Appl. No.: 18/882,277

(22) Filed: Sep. 11, 2024

(65) Prior Publication Data

US 2025/0086147 A1 Mar. 13, 2025

Related U.S. Application Data

(60) Provisional application No. 63/581,801, filed on Sep. 11, 2023.

(51) Int. Cl.
*G06F 16/21* (2019.01)
*G06F 16/25* (2019.01)

(52) U.S. Cl.
CPC .......... *G06F 16/213* (2019.01); *G06F 16/258* (2019.01)

(58) Field of Classification Search
CPC ............................ G06F 16/213; G06F 16/258
See application file for complete search history.

(56) References Cited

U.S. PATENT DOCUMENTS

2007/0073770 A1* 3/2007 Morris .................. G06F 16/258
2007/0136367 A1* 6/2007 van Wyk ............... G06Q 10/06
2013/0117229 A1* 5/2013 Jain ......................... G06F 16/27 707/703
2019/0018832 A1* 1/2019 Pelz .................... G06F 16/2456
2022/0156245 A1* 5/2022 Saimani .............. G06F 16/2272
2022/0207061 A1* 6/2022 Failer .................. G06F 16/2282

* cited by examiner

*Primary Examiner* — Cheyne D Ly

(57) ABSTRACT

Various embodiments comprise systems and methods for providing customer-defined attributes (CDAs) in an enterprise resource planning platform. In an example, a method includes receiving a CDA definition defining a new data field for storing a new CDA and associating the new data field with a source data table as well as a data flow from the source data table to a destination data table. The method further includes initiating a business process including the data flow by generating a new record that includes the source data table and calling at least one logic block by passing information corresponding to the new CDA to the logic block. The logic block identifies the information corresponding to the new CDA and executes at least a portion of the data flow by passing the information corresponding to the new CDA from the source data table to a destination data table.

20 Claims, 11 Drawing Sheets

700A

700B

700C

700D

SYSTEMS AND METHODS FOR CUSTOMER DEFINED ATTRIBUTES

CROSS-REFERENCE TO RELATED APPLICATIONS

This application claims priority to U.S. Provisional Application No. 63/581,801 titled SYSTEMS AND METHODS FOR CUSTOMER DEFINED ATTRIBUTES, filed Sep. 11, 2023, which is incorporated herein by reference in its entirety for all purposes.

BACKGROUND

Businesses often develop custom software to address a variety of business-specific needs including streamlining projects, automating routine functions, meeting client demands, and enhancing the customer experience. However, creating custom software tailored to specific business requirements is a complex endeavor, typically involving the development of extensive source code in an appropriate programming language. The individuals who understand the business needs for this software typically lack the technical expertise to produce enterprise-level software. Consequently, they must collaborate with software development specialists who are responsible for writing, testing, and maintaining the code.

Enterprise Resource Planning (ERP) platforms offer automation and management software for key business processes, including finance, human resources, manufacturing, supply chain, services, procurement, and more. Users frequently need to customize the data transfer operations within ERPs. However, current customization methods are cumbersome and limited in scope. In existing solutions, ERP platforms provide a fixed set of additional fields that users can append to a data transfer operation. These fields are hardcoded and included across all relevant tables. The hardcoding of these fields results in a finite number of fields and a limited range of field types (e.g., text, number, date, dropdowns, etc.). Moreover, these additional fields are shared across all tables within the system, further constraining their utility since the limited set of fields must apply to every table. This hardcoding approach leads to reduced flexibility, increased overhead, and restricted functionality. Additionally, users are often required to implement extensive customizations to ensure proper data flow between tables.

It is with respect to this general technical environment that aspects of the present technology disclosed herein have been contemplated. Furthermore, although a general environment has been discussed, it should be understood that the examples described herein should not be limited to the general environment identified in the background.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to systems and methods for creating and implementing customer-defined attributes in an enterprise resource planning (ERP) platform. In accordance with an embodiment of the present technology, a method of operating a computing system includes: receiving a customer-defined attribute (CDA) definition defining a new data field for storing a new CDA; associating the new data field with a data table and a data flow from the source data table to a destination data table, wherein the data flow utilizes pre-existing logic blocks; initiating a business process comprising the data flow by generating a new record that includes the source data table, wherein the source data table includes the new data field, and wherein the new data field stores information corresponding to the new CDA; and upon generating the new record, calling at least one logic block of the pre-existing logic blocks, wherein calling the at least one logic block includes passing the information corresponding to the new CDA to the at least one logic block. The at least one logic block performs the steps of identifying that the information corresponding to the new CDA was passed to the at least one logic block and executing at least a portion of the data flow by passing the information corresponding to the new CDA from the source data table to the destination data table.

In some embodiments, the destination data table includes the new data field for storing the information corresponding to the new CDA. In some embodiments, the CDA definition includes at least a name and a data type of the new CDA. Associating the new data field with the source data table causes new records including the source data table to include the new data field when the new records are created. The CDA definition, in certain embodiments, was created in a no-code development environment in which new CDAs can be defined and associated with data flows. In some cases, initiating the business process occurs in response to an incoming transaction that triggers the business process. The CDA definition, in some examples, indicates that the new CDA should appear in records including the destination data table.

In an alternative embodiment, a computing system includes one or more computer-readable storage media, a processing system operatively coupled with the one or more computer-readable storage media, and program instructions stored on the one or more computer-readable storage media. The program instructions, when read and executed by the processing system, direct the processing system to at least: receive a customer-defined attribute (CDA) definition defining a new data field for storing a new CDA; associate the new data field with a data table and a data flow from the source data table to a destination data table, wherein the data flow utilizes pre-existing logic blocks; initiate a business process comprising the data flow by generating a new record that includes the source data table, wherein the source data table includes the new data field, and wherein the new data field stores information corresponding to the new CDA; and upon generating the new record, calling at least one logic block of the pre-existing logic blocks, wherein calling the at least one logic block includes passing the information corresponding to the new CDA to the at least one logic block. The at least one logic block identifies that the information corresponding to the new CDA was passed to the at least one logic block and executes at least a portion of the data flow by passing the information corresponding to the new CDA from the source data table to the destination data table.

In yet another embodiment, one or more computer-readable storage media have program instructions stored thereon for implementing customer-defined attributes. The program instructions, when read and executed by a processing system, direct the processing system to at least: receive a customer-defined attribute (CDA) definition defining a new data field for storing a new CDA; associate the new data field with a data table and a data flow from the source data table to a destination data table, wherein the data flow utilizes pre-existing logic blocks; initiate a business process including the data flow by generating a new record including the source data table, wherein the source data table includes the new data field, and wherein the new data field stores information corresponding to the new CDA; and, upon generating the new record, calling at least one logic block of the pre-existing logic blocks, wherein calling the at least one logic block includes passing the information corresponding to the new CDA to the at least one logic block. The at least one logic block identifies that the information corresponding to the new CDA was passed to the at least one logic block and executes at least a portion of the data flow by passing the information corresponding to the new CDA from the source data table to the destination data table.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
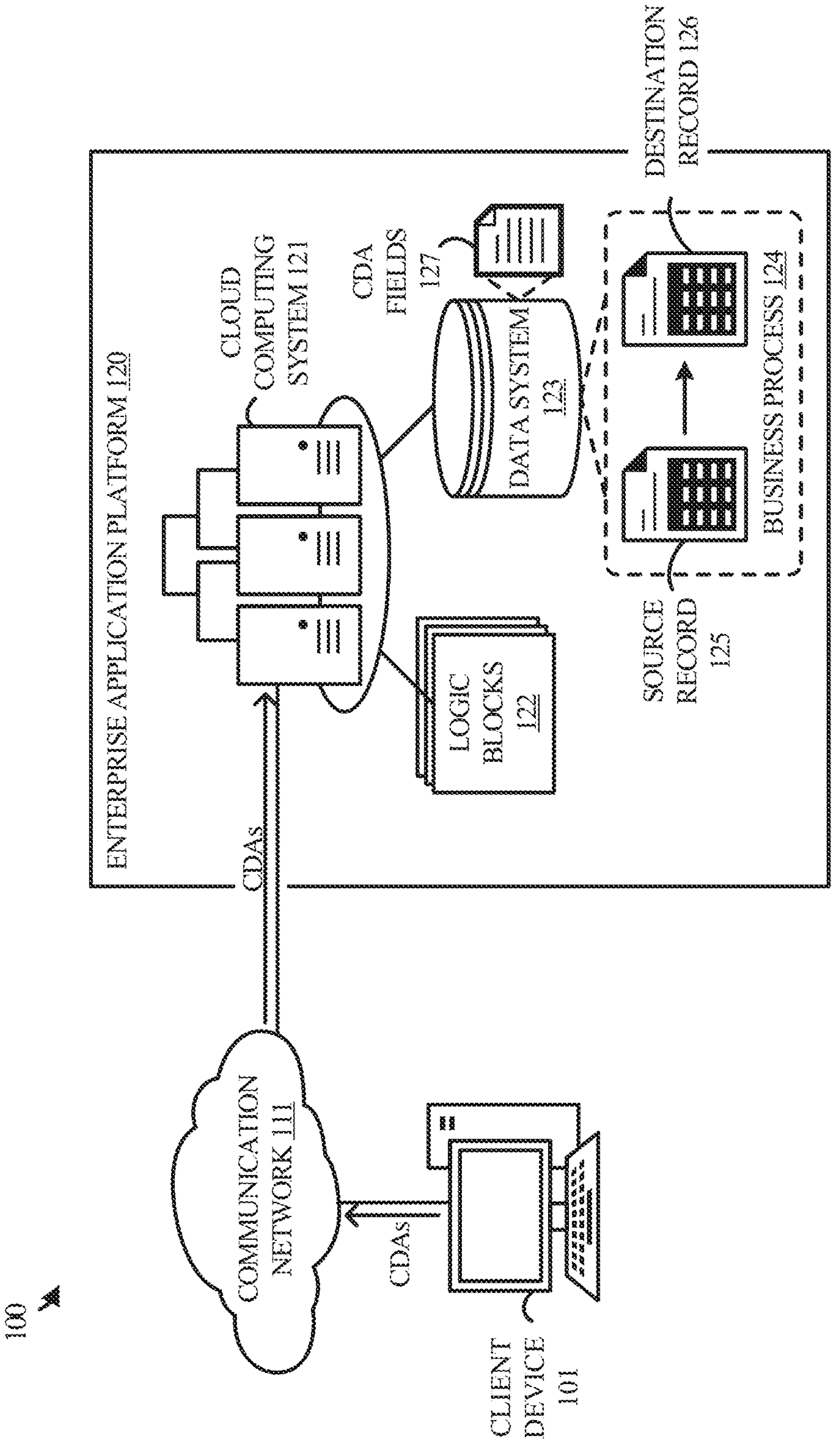
FIG. 1 illustrates an example of an ERP environment capable of providing for customer-defined attributes in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In enterprise resource planning (ERP) environments, customers frequently need to personalize their data model by adding custom fields. Generally, customers can use customization to add fields, but doing so is burdensome and limited. Customer defined attributes (CDAs), as described herein, enable users, such as system administrators, to create and integrate these custom fields into the system utilizing predefined CDA profiles. These profiles represent business processes where data automatically flows from one table to another. In various embodiments, users are afforded the flexibility to create CDAs that are specifically tailored to their unique business requirements. The number of fields or data types within the CDAs is not constrained. Furthermore, CDAs permit users to associate custom fields exclusively with relevant tables.

The set of additional fields or attributes available to customers in existing solutions is limited. Some ERPs provide for a hardcoded set of fields in all necessary tables, leading to a finite number of fields and a limited set of field types (e.g., text, number, date, drop down, etc.) Moreover, the set of available fields in existing solutions is universally shared across all tables in the system, meaning that the finite set of fields is further constrained because it applies to every single table-lacking flexibility, requiring lots of overhead, and having limited functionality. Lastly, in order to get the data to flow between tables, customers using existing solutions must implement extensive customizations to the software.

Thus, the present technology provides for a more dynamic and user-friendly approach to customizing data fields or attributes that allows customers to create CDAs that are tailored to the customer's individual business needs. Thus, there is an unlimited number of fields and data types for customers to add and utilize. The present technology also allows customers to associate those fields with only the relevant tables, rather than sharing the fields across all tables in the system. Moreover, defining the custom data fields is automated by the ERP system such that minimal effort is required by the customer to create new CDAs.

An attribute, as described herein, refers to a field or property that stores specific details about products, customers, transactions, or the like. Attributes can be standard (pre-defined) or custom. An attribute, in some cases, represents a specific piece of information about a record. For example, in a customer database, "customer name," "address," and "phone number," may all be attributes of a customer entity. Thus, a customer-defined attribute, as described herein, is an attribute that ERP customers can create and customize within the ERP system according to their unique business needs. These attributes are not predefined by the ERP software but are instead configured by the user to capture additional data or to reflect specific business processes that are not covered by standard attributes. For example, if a business needs to track a particular characteristic of a product or customer that is not part of the default ERP setup, they can create a CDA to store and manage that information.

In an example, a business may want to create a "sustainability score" CDA for suppliers if the business is particularly focused on sustainability and wishes to evaluate its suppliers based on various environmental responsibility criteria. However, the customer may not find a built-in attribute in the ERP system for this purpose. Thus, using the technology described herein, the customer can create a "sustainability score" attribute, where they can assign a score based on their internal evaluation metrics, such as carbon footprint, use of renewable resources, and compliance with environmental regulations. This custom attribute would therefore allow the business to track and report on the sustainability performance of its suppliers.

In another example, a business may wish to create a "customer loyalty tier" CDA on their ERP platform if the company has a loyalty program where customers are classified into different tiers based on their purchase history, engagement, or other criteria. However, such a customer may not find a standard "customer loyalty tier" attribute in the ERP system. Thus, the customer may create the "customer loyalty tier" CDA, where each customer is assigned a tier such as "bronze," "silver," or "gold." This attribute could then be used to tailor marketing strategies, offer tier-specific promotions, or provide enhanced customer service based on a customer's loyalty level.

With these examples in mind, the process of defining and activating a CDA as described herein is designed to be intuitive and straightforward, with the system automating the implementation of the configuration, thereby minimizing the time and effort required from the customer. To incorporate CDAs into the enterprise application data model, users choose a CDA profile they wish to work with (e.g., the sales orders to receivables profile), defines the new attribute/field, and then establishes the dynamic flowing of the CDA field across various tables. CDA profiles function as an abstraction layer of the ERP platform's data model. These profiles describe the way data flows within the system and are the backbone to the customer's ability to configure their CDAs.

According to the solution described herein, an ERP platform dynamically passes values through to implement the CDAs. As CDA fields are user-defined, they cannot be directly referenced in the pre-shipped metadata of an ERP platform. Nevertheless, within the platform, most transactions are automated through the use of logic blocks. For instance, when a user manually saves an invoice, the system provides a simple action to "create sales order" from that invoice. This action, along with similar automated processes, leverages logic blocks to interpret the invoice and generate a new sales order from it. Thus, to facilitate the dynamic passing of CDA values from one transaction to another, the system passes "additional mappings" into logic block calls when CDA fields are present.

Various technical effects may be appreciated from the implementations disclosed herein. One such technical effect is the improved data integrity and process consistency across an ERP platform. Another technical effect is the enhanced scalability of ERP platforms by allowing CDAs to be easily modified or expanded business needs evolve. Additional technical effects include the reduction in computational overhead, time, and expertise required to tailor an ERP system to meet specific business needs and the reduction in complex coding or other technical knowledge required to create and integrate attributes into an ERP data model. The system's use of logic blocks to manage the flow of CDAs through business processes further optimizes memory usage and reduces computational load on the ERP system.

FIG. 1 illustrates environment 100. Environment 100 is representative of a no-code enterprise resource planning (ERP) environment in which various business processes may be implemented in accordance with some embodiments of the present disclosure. Environment 100 includes client device 101, communication network 111 and enterprise application platform 120. Enterprise application platform 120 includes cloud computing system 121 which hosts logic blocks 122 and data system 123. Data system 123 stores source record 125, destination record 126, and CDA fields 127 to implement business process 124. In other examples, environment 100 may include fewer or additional components than those illustrated in FIG. 1. Likewise, the illustrated components of environment 100 may include fewer or additional components, assets, or connections than shown. Each of client device 101, communication network 111, and enterprise application platform 120 may be representative of a single computing apparatus or multiple computing apparatuses.

Client device 101 is representative of a computing system that includes a processing system and communication transceiver. Client device 101 allows organization operators (e.g., a system analyst) to interact with enterprise application environment 120 over communication network 111. Client device 101 may include other components like a user interface, data storage system, and power supply. Examples of client device 101 include mobile computing devices, such as cell phones, tablet computers, laptop computers, notebook computers, and gaming devices, as well as any other type of mobile computing devices and any combination or variation thereof. Examples of client device 101 also include desktop computers, server computers, and virtual machines, as well as any other type of computing system, variation, or combination thereof. The computing system of client device 101 may reside in a single device or may be distributed across multiple devices and may be a discrete system or could be integrated within other systems, including other systems within environment 100. Client device 101 allows organization operators to select CDAs to be associated with existing business processes (e.g., business process 124). The CDAs may include one or more data fields of one of more data types that are appended to an existing data flow. The number and the type of data fields are not limited.

Communication network 111 could include multiple network elements such as routers, gateways, telecommunication switches, servers, processing systems, or other communication equipment and systems for providing communication and data services. In some examples, communication network 111 could include wireless communication nodes, telephony switches, Internet routers, network gateways, computer systems, communication links, or some other type of communication equipment, including combinations thereof. Communication network 111 may also include optical networks, packet networks, local area networks (LAN), metropolitan area networks (MAN), wide area networks (WAN), or other network topologies, equipment, or systems, including combinations thereof. Communication network 111 may be configured to communicate over wired or wireless communication links. Communication network 111 may be configured to use Internet Protocol (IP), Ethernet, optical networking, wireless protocols, communication signaling, or some other communication format, including combinations thereof. In some examples, communication network 111 includes further access nodes and associated equipment for providing communication services to several computer systems across a large geographic region.

Enterprise application platform 120 is representative of a cloud native no-code platform to provide applications for performing business processes without requiring users to code or manually pipeline data. Cloud computing system 121 in enterprise application platform 120 may include servers, cloud computing systems, or any other computing system, network equipment, apparatus, system, or systems that may connect to another computing system over a communication network. Cloud computing system 121 includes processing systems and communication transceivers. Cloud computing system 121 may also include other components such as routers, servers, data storage systems, and power supply. Cloud computing system 121 may reside in a single device or may be distributed across multiple devices and multiple geographic locations. Cloud computing system 121 may be a discrete system or may be integrated within other systems, including other systems within environment 100. Some examples of cloud computing system 121 include database systems, desktop computers, server computers, cloud computing platforms, and virtual machines, as well as any other type of computing system, variation, or combination thereof.

Cloud computing system 121 hosts logic blocks 122. Logic blocks 122 are representative of software modules to implement various business processes, including business process 124. Cloud computing system 121 may generate logic blocks 122 to implement business process 124 based on metadata for the tenant organization associated with client device 101. For example, cloud computing system 121 may generate logic blocks 122 based on metadata associated with business process 124 in response to a request and then execute logic blocks 122 to perform business process 124. When implementing business process 124, logic blocks 122 determine if any CDAs are associated with business process 124 and includes CDA fields 127 in business process 124 when CDAs are present.

Cloud computing system 121 additionally includes data system 123 which is representative of a computing system that includes at least a processing system, memory, and communication transceiver. Data system 123 may also include other components, like a user interface and power supply, for example. Examples of data system 123 may include server computers and data storage devices deployed on-premises, in the cloud, in a hybrid cloud, or elsewhere, by service providers such as enterprises, organizations, individuals, and the like. Data system 123 may rely on the physical connections provided by one or more other network providers such as transit network providers, Internet backbone providers, and the like to communicate with external systems. Data system 123 stores data records like transaction data, accounting records, inventory data, and/or other types of data to implement various business processes within enterprise application platform 120.

In this example, data system 123 interfaces with logic blocks 122 to implement business process 124. In particular, cloud computing system 121 executes logic blocks 122 to pass data from source record 125 to destination record 126. Business process 124 may include a read/write operation, but other types of business processes are applicable. For example, business process 124 may include data transform operations, data generation operations, and the like. Data system 123 also stores CDA fields 127 defined on client device 101.

In some examples, the computing systems of data system 123 could include a web server, Content Distribution Network (CDN), reverse proxy, load balancer, middleware, cloud server, network switch, router, switching system, packet gateway, network gateway system, Internet access node, application server, database system, service node, firewall, or some other communication system, including combinations thereof. The computing system of data system 123 may reside in a single device or may be distributed across multiple devices within cloud computing system 121 and may be a discrete system or could be integrated within other systems, including other systems within environment 100.

Client device 101, communication network 111, and enterprise application platform 120 include microprocessors, software, memories, transceivers, bus circuitry, and the like. The microprocessors include Central Processing Units (CPUs), Graphical Processing Units (GPUs), Application-Specific Integrated Circuits (ASICs), Field Programmable Gate Arrays (FPGAs), and/or other types of processing circuitry. The memories include Random Access Memory (RAM), flash circuitry, disk drives, and/or the like. The memories store software like operating systems, security modules, user applications, web applications, and browser applications. The microprocessors retrieve the software from the memories and execute the software to drive the operation of environment 100 as described herein. The links that connect the elements of environment 100 use metallic links, glass fibers, radio channels, or some other communication media. The communication links use Time Division Multiplex (TDM), Data Over Cable System Interface Specification (DOCSIS), Internet Protocol (IP), General Packet Radio Service Transfer Protocol (GTP), Institute of Electrical and Electron Engineers (IEEE) 802.11 (WIFI), IEEE 802.3 (ENET), Long Term Evolution (LTE), Fifth Generation New Radio (5GNR), virtual switching, inter-processor communication, bus interfaces, and/or some other data communication protocols.

Figure 2:
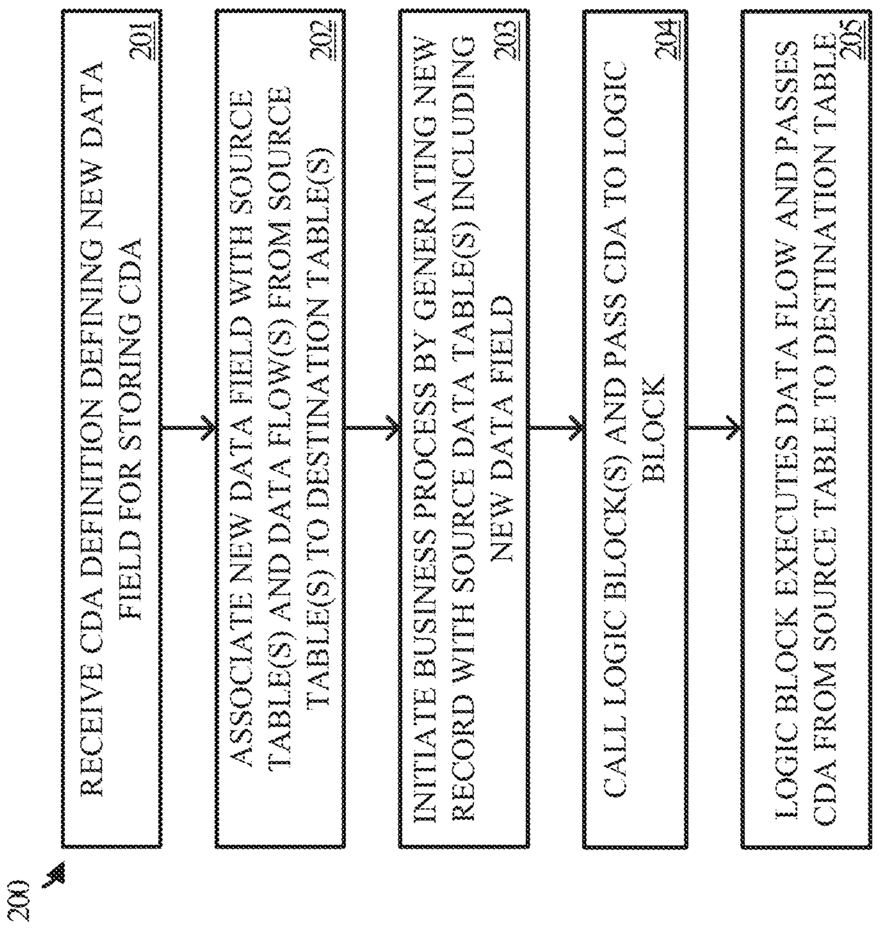
FIG. 2 is a flowchart illustrating a set of operations for implementing customer-defined attributes in accordance with some embodiments of the present technology.

In some examples, environment 100 implements process 200 illustrated in FIG. 2. It should be appreciated that the structure and operation of communication network 100 may differ in other examples.

FIG. 2 illustrates process 200. Process 200 is an example of a CDA execution process in an ERP computing system environment. Process 200 may be implemented in program instructions in the context of any of the software applications, module components, machine learning components, or such elements or one or more computing devices. The program instructions direct the computing device(s) to operate as follows, referred to in the singular for the sake of clarity.

The operations of process 200 include receiving a CDA definition defining a new data field for storing a new CDA (step 201). The operations further include associating the new data field with a source data table and a data flow from the source data table to a destination data table (step 202). The data flow utilizes pre-existing logic blocks, in some examples, where the pre-existing logic blocks include logic that defines a business process flowing data between tables. The operations of process 200 further include initiating a business process including the data flow by generating a new record including the source data table (step 203). The source data table includes the new data field and the new data field stores information corresponding to the new CDA. The operations further include, upon generating the new record, calling at least one logic block of the pre-existing logic blocks (step 204). Calling the at least one logic block includes passing the information corresponding to the new CDA to the at least one logic block. The at least one logic block then identifies that the information corresponding to the new CDA was passed to it and executes at least a portion of the data flow by passing the information corresponding to the new CDA from the source data table to the destination data table (step 205).

It should be noted that pre-existing logic blocks were defined prior to the creation of the new data field but include "additional mappings" logic that instruct the logic blocks how to include new or additional information (including CDAs) in the business process. For example, an ERP platform may already include a logic block that represents a process such as "create invoice from sales order." The logic block takes information from a sales order and writes it to the receivables table. This logic block is already defined and used in the ERP platform and does not include any explicit logic indicating how to handle the new CDA. The logic block, nonetheless, recognizes the new CDA when performing the business process as part of its "additional mappings" logic and is able to handle the CDA appropriately based on instructions defined by the customer during the CDA creation process.

Figure 3:
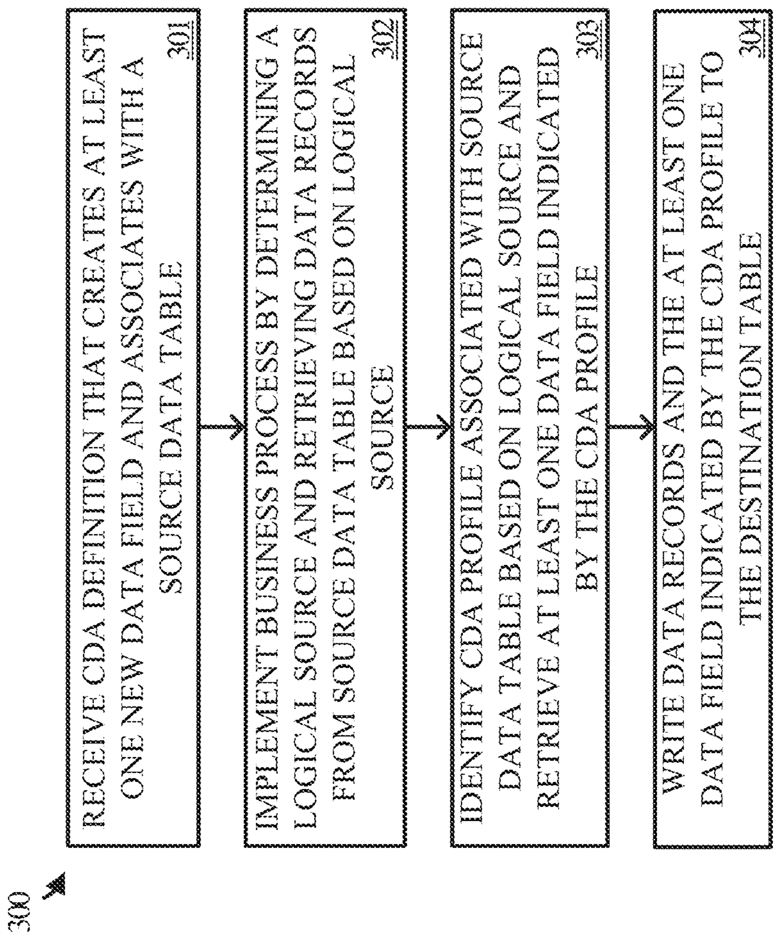
FIG. 3 is a flowchart illustrating a set of operations for implementing customer-defined attributes in accordance with some embodiments of the present technology.

FIG. 3 illustrates process 300. Process 300 is another example of CDA execution process in an ERP computing system environment. Process 300 may be implemented in program instructions in the context of any of the software applications, module components, machine learning components, or such elements or one or more computing devices. The program instructions direct the computing device(s) to operate as follows, referred to in the singular for the sake of clarity.

The operations of process 300 include receiving a customer defined attribute profile that associates at least one data field with at least one source data table (step 201). In some examples, the CDA definition further associates the at least one data field with at least one destination data table. The operations further include implementing a business process by determining a logical source and retrieving data records from one or more source data tables based on the logical source (step 202). The operations further include identifying the CDA profile associated with the source data table based on the logical source and retrieving the at least one data field indicated by the CDA profile (step 203). The operations further include writing the data records and the at least one data field indicated by the CDA profile to at least one destination table (step 204).

Referring back to FIG. 1, environment 100 includes a brief example of processes 200 and 300 as employed by one or more applications hosted by the various computing devices including environment 100.

In operation, client device 101 accesses a CDA profile for business process 124 and selects a set of CDA fields 127 to associate with source record 125 and destination record 126 in business process 124. For example, client device 101 may render a user interface to display the CDA profile for business process 124 and may receive user inputs selecting CDA fields 127 for the CDA profile. The no-code nature of enterprise application platform 120 allows a user to indicate CDA fields 127 without having to manually program the data flows to get CDA fields 127 to flow to destination record 126. Client device 101 indicates the CDA field selections to cloud computing system 121 over communication network 111. Cloud computing system 121 receives the CDA field selections and stores the selections in the CDA profile for business process 124 (step 301). For example, cloud computing system 121 may store a CDA profile in memory that identifies business process 124, the data flow from source record 125 to destination record 126, and that CDA fields 127 are to be appended to business process 124.

Subsequently, cloud computing system 121 generates and executes one or more of logic blocks 122, which execute to perform business process 124 based on metadata associated with business process 124. The execution of logic blocks may be event driven, scheduled, or continuous. For example, cloud computing system 121 may form and execute logic blocks 122 in response to a notification/request generated by client device 101. To implement business process 124, logic blocks 122 determines the logical source for the process is source record 125. In response, logic blocks 122 retrieves the data from source record 125 (step 302). Logic blocks 122 accesses the CDA profile for business process 124 stored by cloud computing system 121 to determine if any CDA fields are appended to process 124. Logic blocks 122 determines that CDA fields 127 share the same logical source as business process 124 based on the CDA profile for business process 124 and responsively retrieves CDA fields 127 (step 303). Logic blocks 122 writes the data retrieved from source record 125 and CDA fields 127 to destination record 126 to perform business process 124 (step 304).

Figure 4:
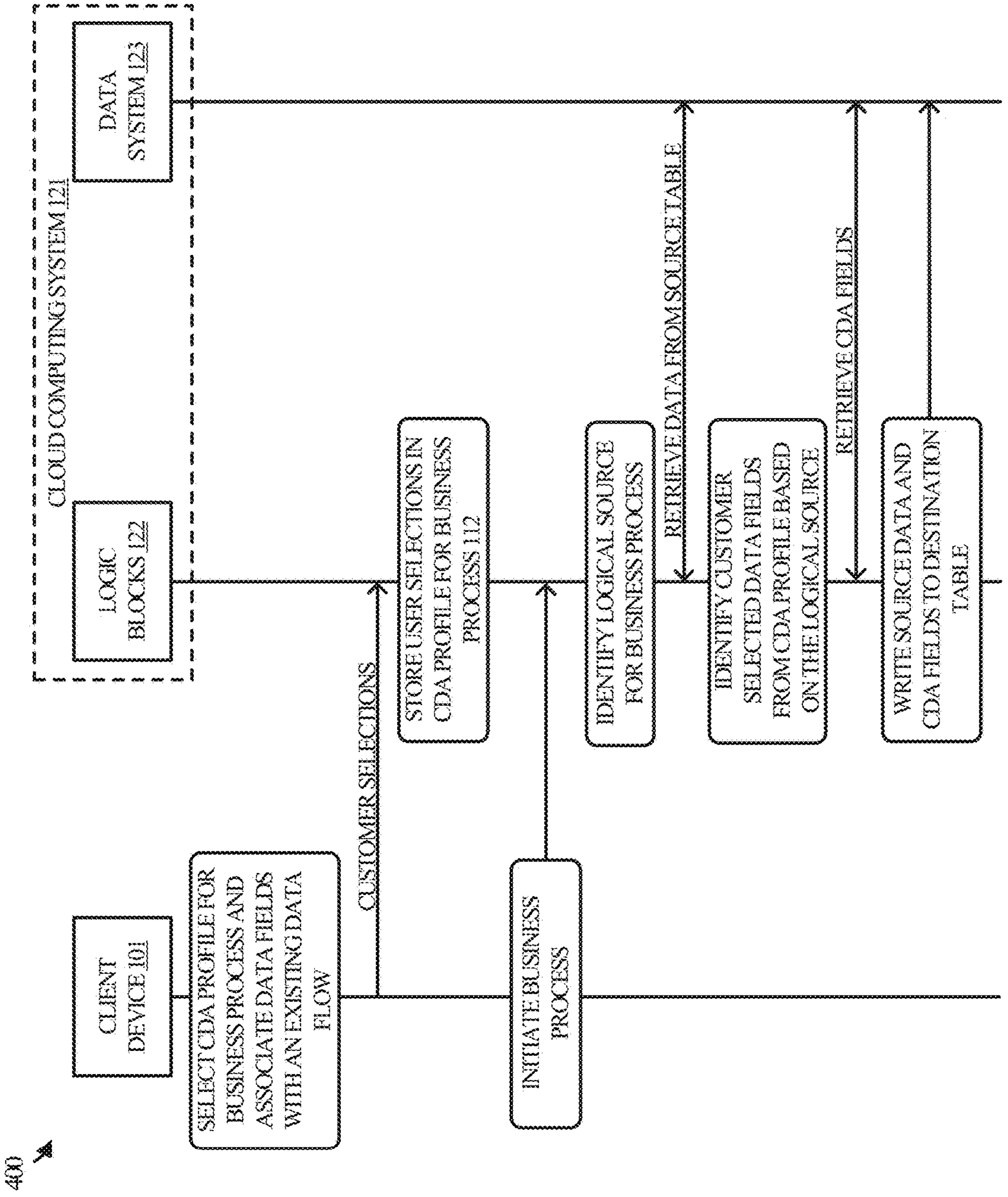
FIG. 4 illustrates an example of a flow for generating and implementing customer-defined attributes in accordance with some embodiments of the present technology.

FIG. 4 illustrates process 400. Process 400 includes an exemplary customer defined attributes process. In some examples, client device 101 renders a user interface to display a CDA profile for business process 124. The user interface includes selectable options to associate user selected data fields, define field behavior, and select applications for the fields. Client device 101 receives user inputs selecting CDA fields 127, defining the behavior of fields 127, and the applications associated with business process 124 to process CDA fields 127. For example, the user inputs may input the field names for CDA fields 127, define their source as source record 125, define their destination as destination record 126, and define CDA fields 127 as text type data. It should be appreciated that the number of data fields that include CDA fields 127 and the number of data types are not limited. Client device 101 indicates the user selections to logic blocks 122 in cloud computing system 121 over communication network 111.

Subsequently, client device 101 initiates business process 124. For example, client device 101 may transfer a request to write data from a sales data table to a customer invoice table to business process 124. Cloud computing system 121 executes logic blocks 122 to implement business process 124. Logic blocks 122 identifies the logical source (i.e., where to pull data from) for business process 124 is source record 125. Logic blocks 122 reads source record 125 to retrieve the data for process 124. Logic blocks 122 accesses the CDA profile for business process 124 to check if there are any user defined fields appended to process 124. Logic blocks 122 identifies that CDA fields 127 are appended to process 124 based on the shared logical source. Logic blocks 122 reads CDA fields 127 from source record 125. Logic blocks 122 writes the process data retrieved from source record 125 to destination record 126 to implement business process 124. In addition, logic blocks 122 writes CDA fields 127 to destination record 126 in the method defined by the CDA profile. For example, logic blocks 122 may write CDA fields 127 as text data based on the requirements specified in the CDA profile.

Figure 5:
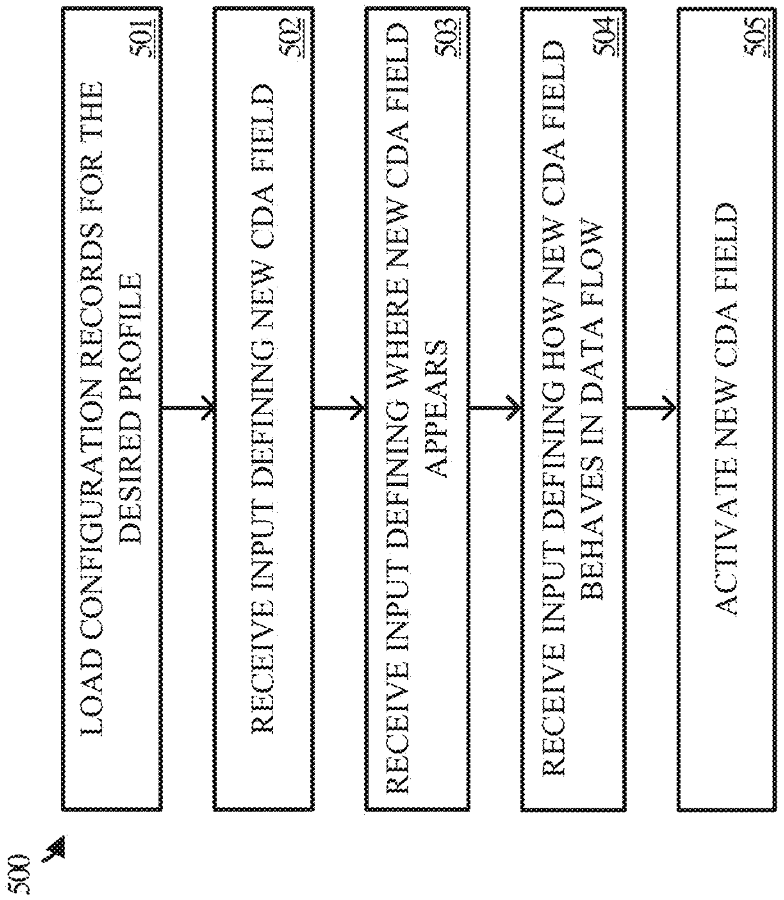
FIG. 5 is a flowchart illustrating a set of operations for creating customer-defined attributes in accordance with some embodiments of the present technology.

FIG. 5 illustrates CDA activation process 500. CDA activation process 500 is an example of a CDA creation and activation process in an ERP computing system environment. CDA activation process 500 may be implemented in program instructions in the context of any of the software applications, module components, machine learning components, or such elements or one or more computing devices. The program instructions direct the computing device(s) to operate as follows, referred to in the singular for the sake of clarity.

CDA activation process 500 includes loading configuration records for a desired profile (step 501). The desired profile may be indicated, in some examples, by a system administrator using the customer side of the ERP platform.

The administrator selects a profile from a catalog existing on the ERP platform and then selects an option to load the configuration corresponding to the profile. In response to the user's selection of the option to load the configuration, the ERP system automatically reads the definition of the existing profile including the relevant tables and creates all of the configuration records the customer needs to define in order to create their desired CDA and get it to flow how they wish. The profile from the catalog corresponds to a business process for which programming already exists. For example, a profile may correspond to the business process "create invoice from sales order." The business process includes at least one logic block that takes information from sales order records and writes it to a receivables table. As mentioned, each profile, in some examples, is pre-defined on the ERP platform.

CDA activation process 500 further includes, once the configuration records are loaded for the selected profile, receiving input defining a new CDA field (step 502). The new CDA field is defined in the "assign fields" user interface (UI) of the CDA creation program of the ERP platform. The input describes a new field that is intended to store a previously unaccounted for attribute. CDA activation process 500 further includes receiving input defining where the new CDA field appears (step 503). For example, the customer may indicate that they want the new CDA field to appear in both the sales order detail (i.e., the source table) and the receivables detail (i.e., the destination table). Thus, during the CDA activation process, the customer has full control over where the field is added and where it flows by calling on the existing profile from the catalog. CDA activation process 500 further includes receiving input defining how the new CDA field behaves in a data flow (step 504). Once the user indicates where the new CDA field is supposed to be in the system, they can define specify the behavior of the new field. The user may further configure how or if the CDA appears in certain applications, reports, and/or tables. CDA activation process 500 further includes activating the new CDA field based on the information received in steps 502-504.

Figure 6:
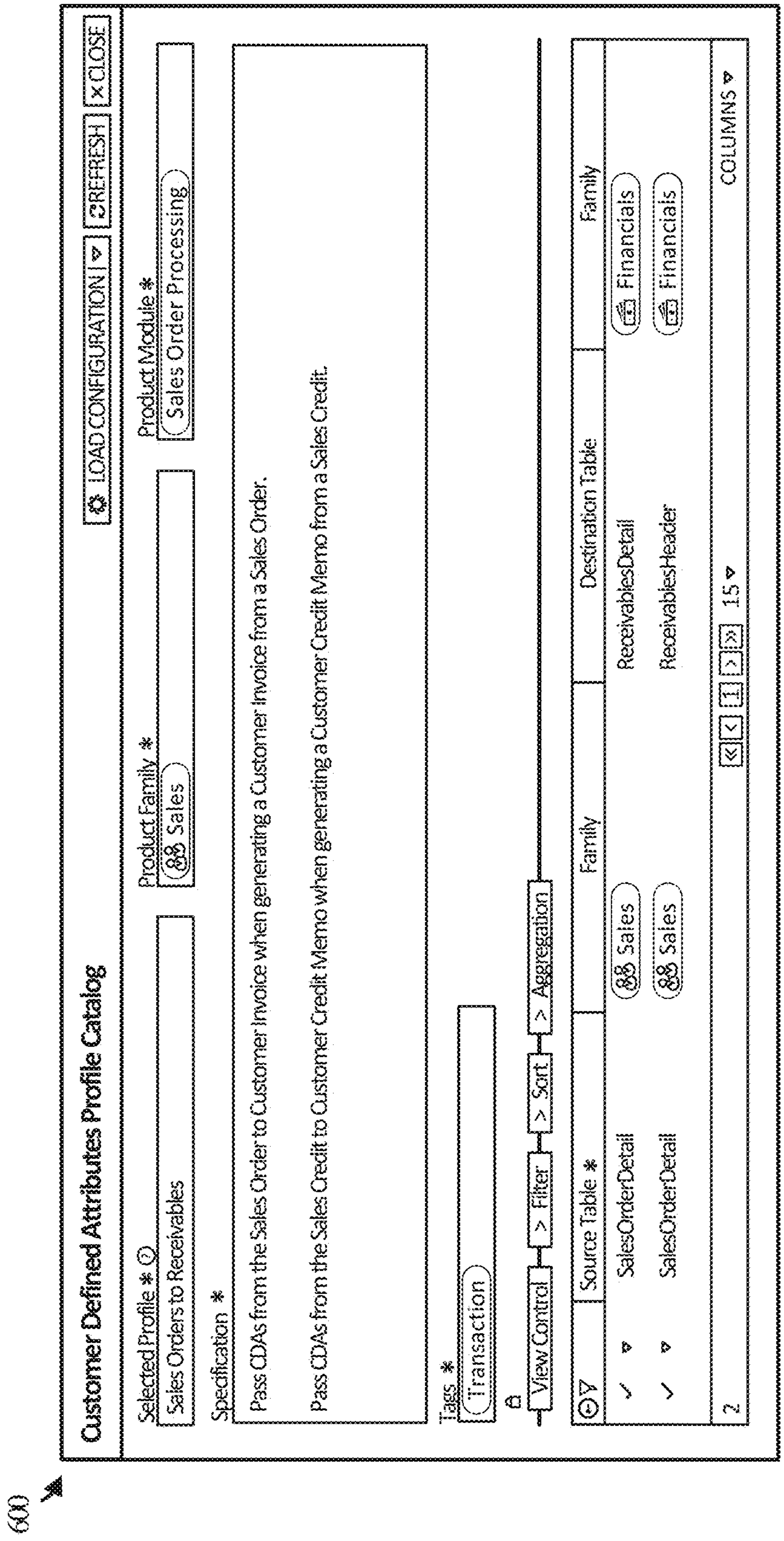
FIG. 6 illustrates an example of a user interface for selecting a configuration corresponding to a customer-defined attribute in accordance with some embodiments of the present technology.

FIG. 6 illustrates a CDA profile catalog in user interface 600 of a no-code ERP platform. User interface 600 includes information corresponding to a selected CDA profile including a name of the selected profile, a product family of the profile, a product module of the profile, and a specification describing the profile. User interface 600 further includes a table indicating source tables and destination tables associated with the profile.

In the example of FIG. 6, the profile corresponds to a sales order to receivables flow. As discussed, a CDA profile is a metadata type that captures what the ERP platform data model looks and behaves like. As an abstraction of the data model, CDA profiles remove the need for customers/implementation specialists to have an in-depth understanding of enterprise application platform metadata.

Thus, the profile shown in FIG. 6 captures what the existing sales order to receivables flow looks and behaves like. As described in the specification and illustrated in the table of user interface 600, the sales order to receivables profile passes CDAs from the sales order to the customer invoice when generating a customer invoice from a sales order. The profile also passes CDAs from the sales credit to the customer credit memo when generating a customer credit memo from a sales account. Thus, if a customer desires to create a CDA in sales orders that also flows to the customer invoice and the general ledger, the customer may select the sales order to receivables profile shown in user interface 600. To select the profile and begin defining the CDA, the user would select "load configuration" in the upper right-hand corner of user interface 600. Once the user selects the option to "load configuration," the system automatically reads the definition of the selected profile including what all the relevant tables are and creates all the configuration records that the customer needs to define in order to get their new CDA(s) to flow how they wish. Then, when creating the new CDA, the profile is leveraged by the system to identify to the user what needs to be configured and what options are available when configuring the new CDA, as shown in FIGS. 7A-7D.

FIGS. 7A-7D illustrate user interfaces 700A-700D to create and define CDAs for a business process executed by a no-code ERP platform. For example, client device 101 may render user interfaces 700A-700D to create a new CDA for business process 124 without requiring the user to manually code or pipeline customer-selected fields. As illustrated in FIGS. 7A-7D, to configure CDAs, a customer simply loads configuration records for the desired profile and then the system determines what the customer needs to configure and creates the shell of configuration records. The user can then define the CDA field, indicate where the field should appear, and indicate how the field should behave. Then, upon activation, the system makes all necessary customizations on behalf of the user.

Figure 7A:
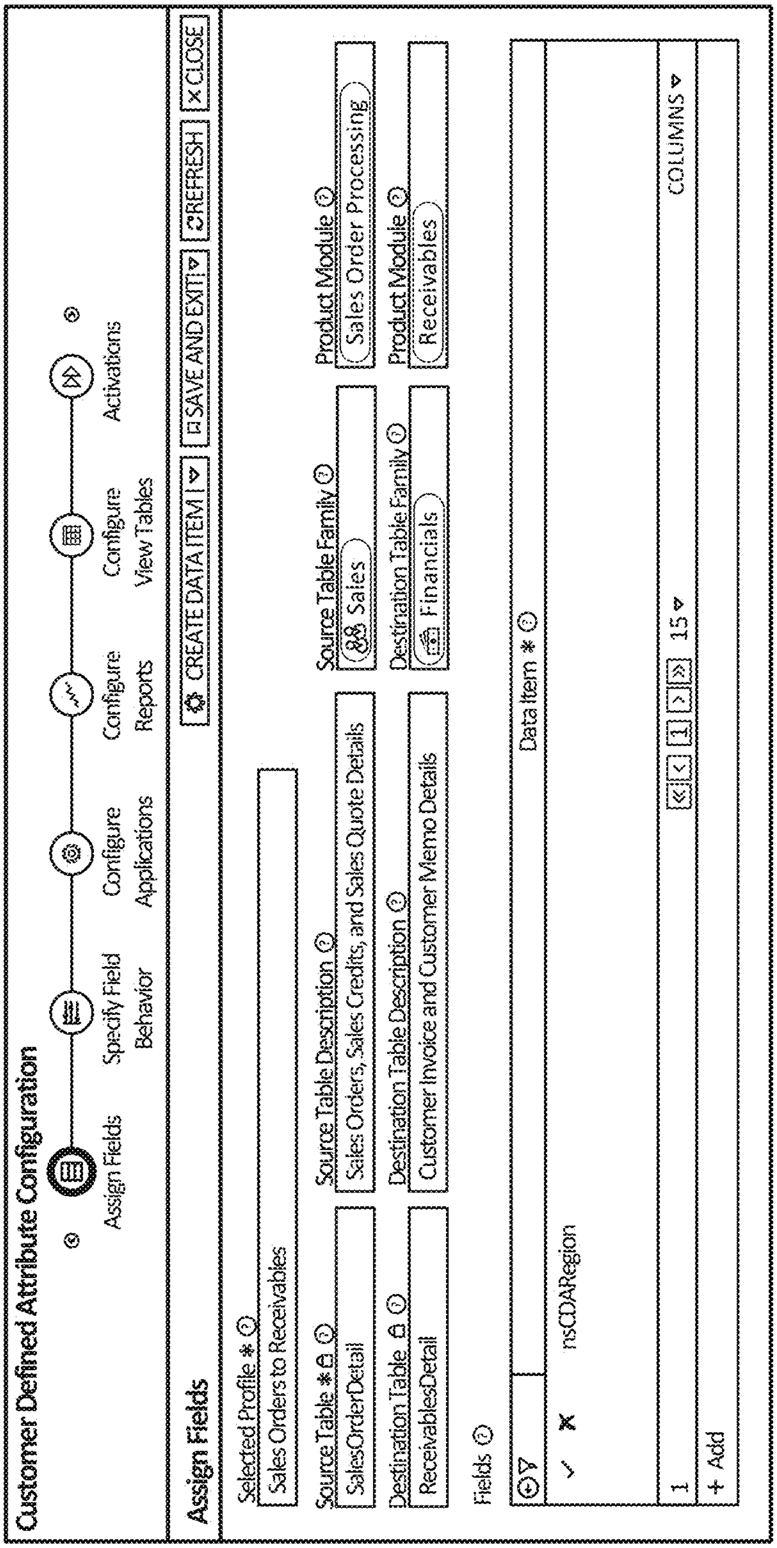
FIGS. 7A-7D illustrate an example of a series of user interfaces for defining a customer-defined attribute in accordance with some embodiments of the present technology.

FIG. 7A illustrates user interface 700A in which a customer can assign fields (i.e., CDA fields) to certain locations within the profile. Via user interface 700A, the user indicates where the new field is supposed to be (i.e., in which tables). Thus, after the user has selected the desired profile "sales order to receivables" and loaded the configuration, as in the example of FIG. 6, they may be presented with user interface 700A to first assign the CDA(s) to the business process and corresponding tables. In user interface 7A, one new attribute field is being created, "nsCDARegion," which flows from the "SalesOrderDetail" source table to the "ReceivablesDetail" destination table. Once completed, the user may select the option to "create data item," and continue to the next step of specifying the behavior of the new field and render user interface 700B.

Figure 7B:
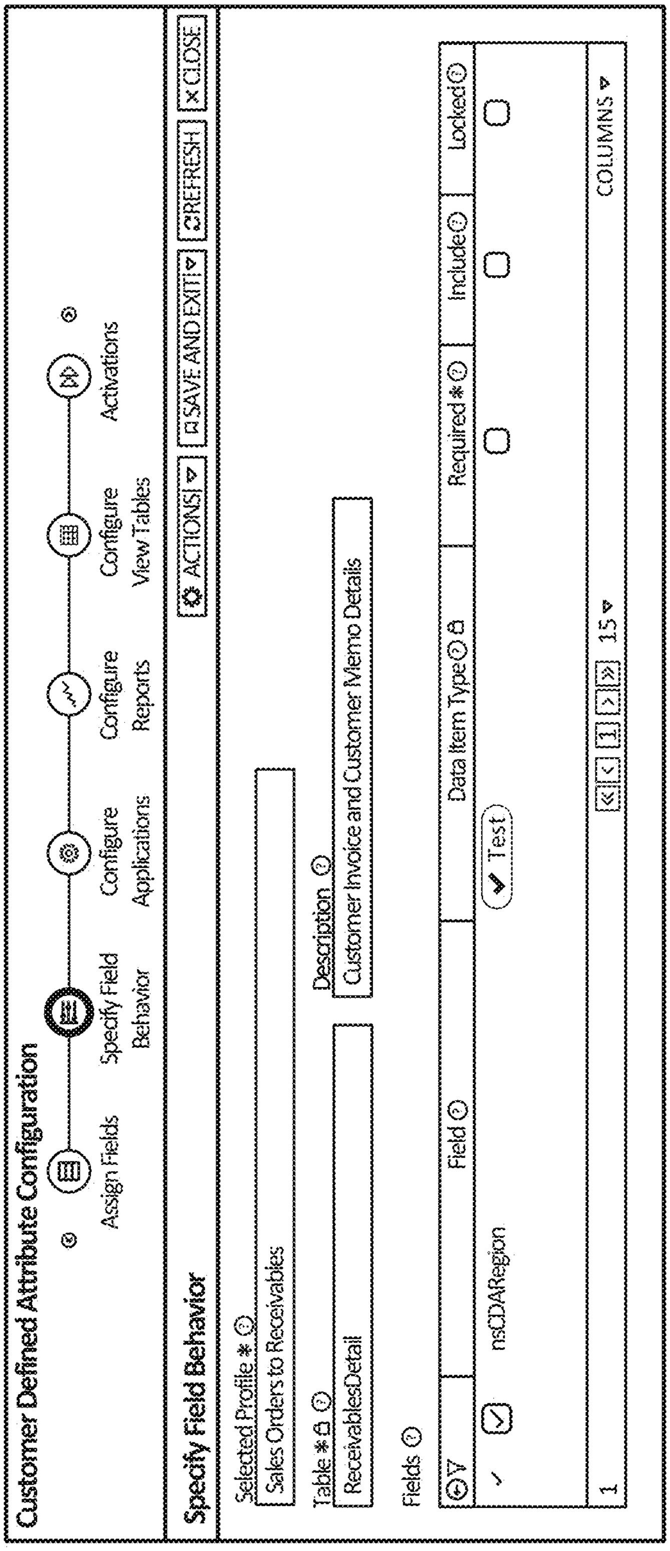

FIG. 7B illustrates user interface 700B which includes user options to specify the behavior of the new "nsCDARegion" field. In this example, a user can specify the behavior of the new "nsCDARegion" field. As part of specifying the behavior of the new field, the user specifies the data type of the new field (e.g., string, numeric, test, alpha-numeric, etc.). The user can also select if or when the new field is required, included, and/or locked. Once completed, the user may select the "actions" option and continue to the next step of configuring applications that may include the new field and render user interface 700C.

Figure 7C:
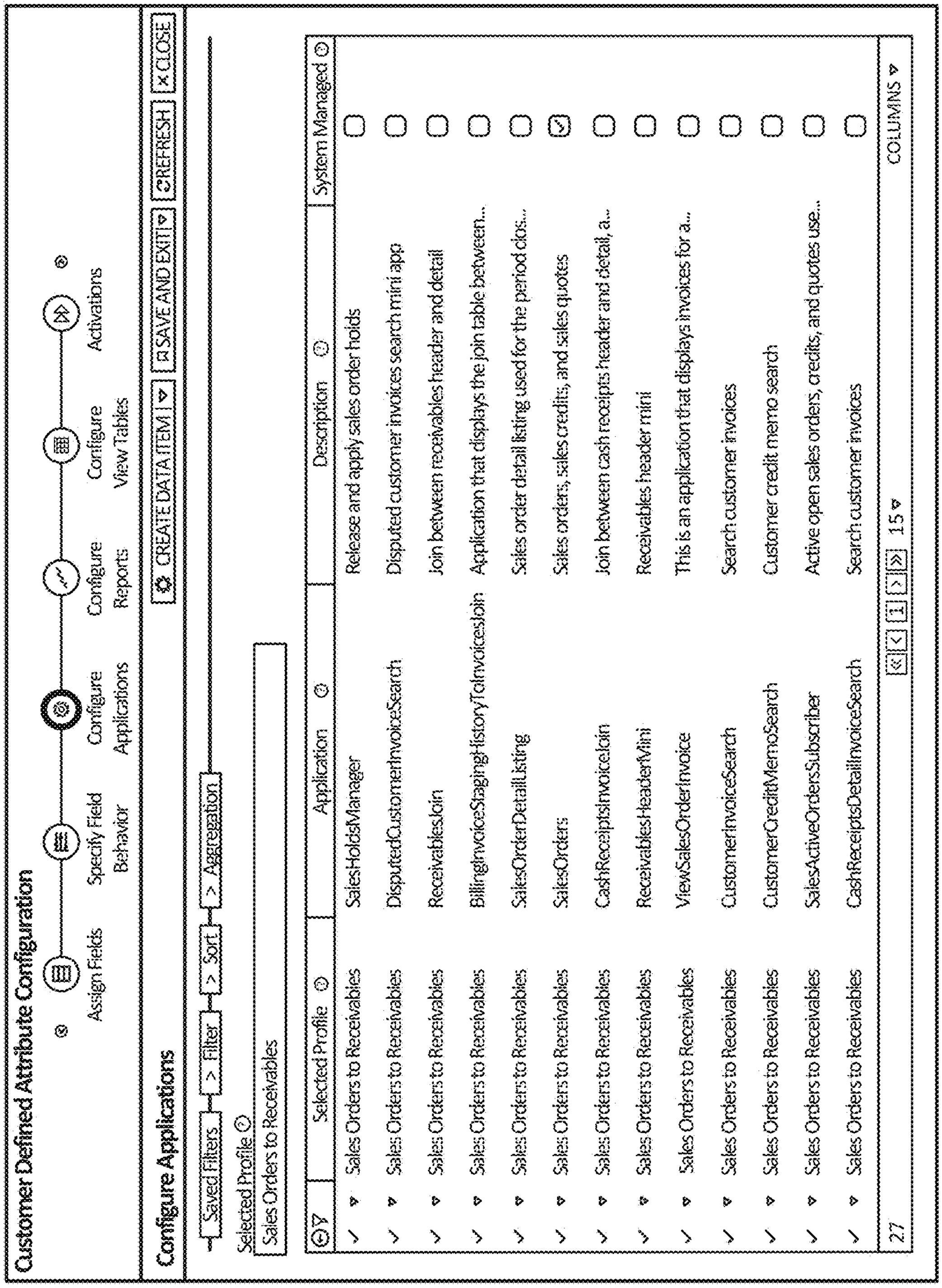

FIG. 7C illustrates user interface 700C that includes options to configure applications associated with the CDA profile. User interface 700C includes a list of all applications that are relevant to the tables selected in the prior steps. The list shown in the user interface is automatically generated and populated by the ERP system based on the selected profile. Thus, the user must simply select which applications from the list they want to include the new CDA field. In the example of FIG. 7C, the user has selected the "SalesOrders" application to include the new field. Although not shown, the user may configure additional aspects of the platform such as reports and view tables in a similar manner to how the applications are configured in the example of FIG. 7C.

Figure 7D:
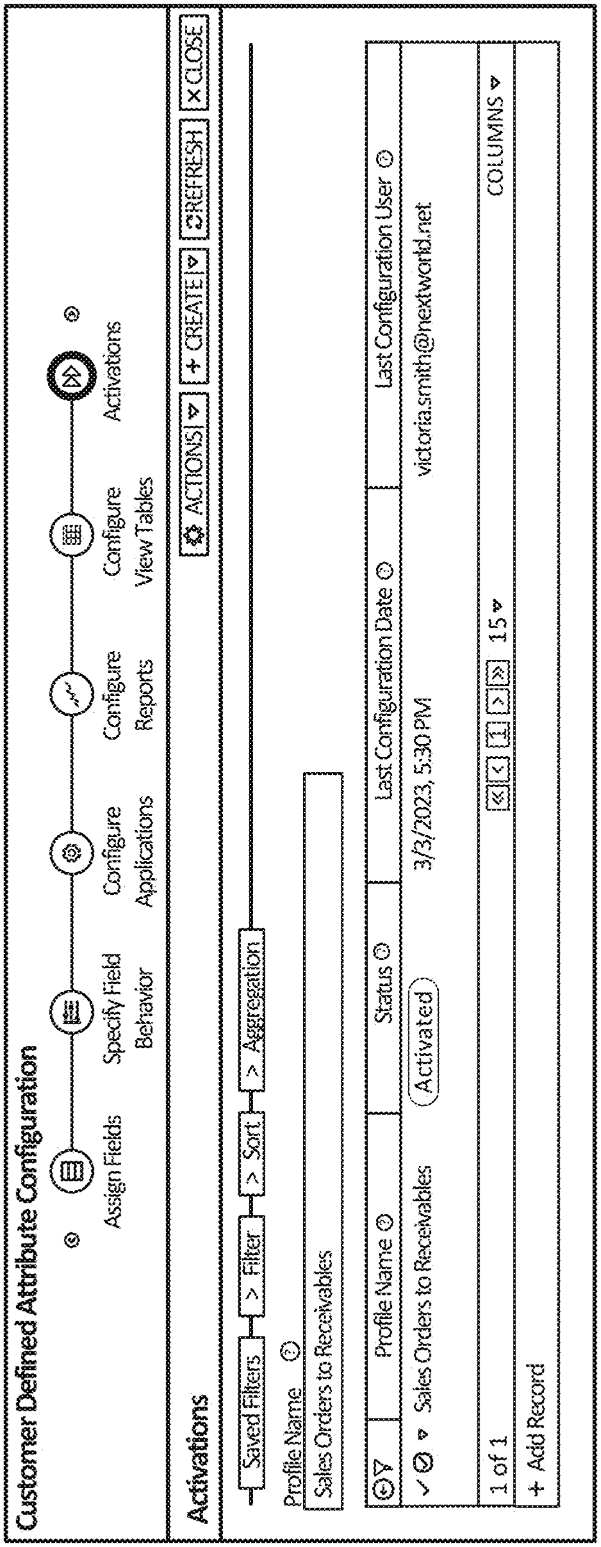

FIG. 7D illustrates user interface 700D for activating or updating the new CDA field. In the example of a brand new CDA field, a user may activate the new CDA field from user interface 700D after completing the prior configuration steps. In the example of an existing CDA field that is being changed or updated, the user may update the new CDA field to reflect any changes made to its configuration in the prior configuration steps. Once the new field is activated and/or updated, the associated business process(es) will include the new field and populate it with corresponding attribute information during business flows.

Figure 8:
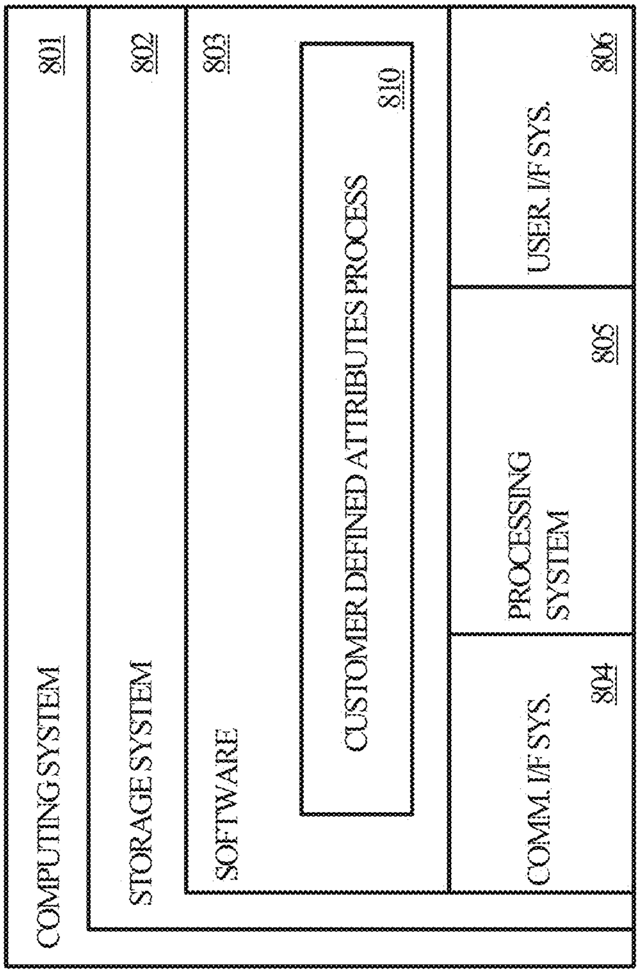
FIG. 8 is an example of a computing system in which some embodiments of the present technology may be utilized.

FIG. 8 illustrates computing system 801 to implement customer defined attributes according to an implementation of the present technology. Computing system 801 is representative of any computing system or collection of systems with which the various operational architectures, processes, scenarios, and sequences disclosed herein for defining, configuring, and/or executing data transforms. Computing system 801 may be implemented as a single apparatus, system, or device or may be implemented in a distributed manner as multiple apparatuses, systems, or devices.

Computing system 801 includes storage system 802, communication interface 804, user interface 806, and processing system 805. Processing system 805 is linked to communication interface 804 and user interface 806. Storage system 802 stores software 803, which includes customer defined attributes process 810. Computing system 801 may include other well-known components such as batteries and enclosures that are not shown in the present example for clarity. Examples of computing system 801 include, but are not limited to, desktop computers, laptop computers, server computers, routers, web servers, cloud computing platforms, and data center equipment, as well as any other type of physical or virtual server machines, physical or virtual routers, containers, and any variation or combination thereof.

Processing system 805 loads and executes software 803 from storage system 802. Software 803 includes and implements customer defined attributes process 810, which is representative of the operations discussed with respect to the preceding figures. For example, customer defined attributes process 810 may implement processes 200, 300, and 500 from the preceding Figures. When executed by processing system 805 to perform the processes described herein, software 803 directs processing system 805 to operate as described for at least the various processes, operational scenarios, and sequences discussed in the foregoing implementations. Computing system 801 may optionally include additional devices, features, or functionality not discussed for purposes of brevity.

Referring still to FIG. 8, processing system 805 may include a micro-processor and other circuitry that retrieves and executes software 803 from storage system 802. Processing system 805 may be implemented within a single processing device but may also be distributed across multiple processing devices or sub-systems that cooperate in executing program instructions. Examples of processing system 805 include general purpose central processing units, graphical processing units, application specific processors, and logic devices, as well as any other type of processing devices, combinations, or variations thereof.

User interface 806 includes components that interact with a user to receive user inputs and to present media and/or information. User interface 806 may include a speaker, microphone, buttons, lights, display screen, touch screen, touch pad, scroll wheel, communication port, or some other user input/output apparatus, including combinations thereof. User interface 806 may be omitted in some examples. For example, computing system 801 may implement customer defined attributes process 810 to form user interfaces 600 and 700A-700D for display on user interface 806.

Storage system 802 may include any computer-readable storage media readable by processing system 805 and capable of storing software 803. Storage system 802 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage media a propagated signal.

In addition to computer-readable storage media, in some implementations storage system 802 may also include computer-readable communication media over which at least some of software 803 may be communicated internally or externally. Storage system 802 may be implemented as a single storage device but may also be implemented across multiple storage devices or sub-systems co-located or distributed relative to each other. Storage system 802 may include additional elements, such as a controller, capable of communicating with processing system 805 or possibly other systems.

Software 803 (including customer defined attributes process 810) may be implemented in program instructions and among other functions may, when executed by processing system 805, direct processing system 805 to operate as described with respect to the various operational scenarios, sequences, and processes illustrated herein. For example, software 803 may include program instructions for implementing customer defined attributes in business processes in a cloud-based ERP application as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 803 may include additional processes, programs, or components, such as operating system software, virtualization software, or other application software. Software 803 may also include firmware or some other form of machine-readable processing instructions executable by processing system 805.

In general, software 803 may, when loaded into processing system 805 and executed, transform a suitable apparatus, system, or device (of which computing system 801 is representative) overall from a general-purpose computing system into a special-purpose computing system customized to provide customer defined attributes in business processes as described herein. Indeed, encoding software 803 on storage system 802 may transform the physical structure of storage system 802. The specific transformation of the physical structure may depend on various factors in different implementations of this description. Examples of such factors may include, but are not limited to, the technology used to implement the storage media of storage system 802 and whether the computer-storage media are characterized as primary or secondary storage, as well as other factors.

For example, if the computer readable storage media are implemented as semiconductor-based memory, software 803 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface 804 may include communication connections and devices that allow for communication with other computing systems (not shown) over communication networks (not shown). Examples of connections and devices that together allow for inter-system communication may include network interface cards, ports, antennas, power amplifiers, radio frequency (RF) circuitry, transceivers, and other communication circuitry. The connections and devices may communicate over communication media to exchange communications with other computing systems or networks of systems, such as metal, glass, air, or any other suitable communication media. Communication interface 804 may be configured to use Time Division Multiplex (TDM), Internet Protocol (IP), Ethernet, optical networking, wireless protocols, communication signaling, or some other communication format, including combinations thereof. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The techniques introduced herein may be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media or machine-readable medium suitable for storing electronic instructions.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "platform," "environment," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method of operating a computing system, the method comprising:

receiving a customer-defined attribute (CDA) definition defining a new data field for storing a new CDA, wherein the CDA definition is received via a CDA profile that abstracts a data model of the computing system, the CDA profile identifying a source data table and a destination data table as part of a pre-defined business process;

associating the new data field with the source data table and a data flow from the source data table to the destination data table, wherein the data flow utilizes pre-existing logic blocks and the pre-existing logic blocks include additional mappings logic that enables recognition and processing of the new data field without modification to the pre-existing logic blocks, and wherein the pre-existing logic blocks were defined prior to creation of the new data field;

initiating a business process comprising the data flow by generating a new record comprising the source data table, wherein the source data table includes the new data field, and wherein the new data field stores information corresponding to the new CDA; and upon generating the new record, calling at least one logic block of the pre-existing logic blocks, wherein calling the at least one logic block includes passing the information corresponding to the new CDA to the at least one logic block, wherein the at least one logic block:

identifies that the information corresponding to the new CDA was passed to the at least one logic block; and executes at least a portion of the data flow by passing the information corresponding to the new CDA from the source data table to the destination data table.

2. The method of claim 1, wherein the destination data table includes the new data field for storing the information corresponding to the new CDA.

3. The method of claim 1, wherein the CDA definition comprises at least a name and a data type of the new CDA.

4. The method of claim 1, wherein associating the new data field with the source data table causes new records comprising the source data table to include the new data field when the new records are created.

5. The method of claim 1, wherein the CDA definition was created in a no-code development environment in which new CDAs can be defined and associated with data flows.

6. The method of claim 1, wherein initiating the business process occurs in response to an incoming transaction that triggers the business process.

7. The method of claim 1, wherein the CDA definition indicates that the new CDA should appear in records comprising the destination data table.

8. A computing system comprising:

one or more computer-readable storage media;

a processing system operatively coupled with the one or more computer-readable storage media; and program instructions stored on the one or more computer-readable storage media, wherein the program instructions, when read and executed by the processing system, direct the processing system to at least:

receive a customer-defined attribute (CDA) definition defining a new data field for storing a new CDA, wherein the CDA definition is received via a CDA profile that abstracts a data model of the computing system, the CDA profile identifying a source data table and a destination data table as part of a pre-defined business process;

associate the new data field with the source data table and a data flow from the source data table to the destination data table, wherein the data flow utilizes pre-existing logic blocks and the pre-existing logic blocks include additional mappings logic that enables recognition and processing of the new data field without modification to the pre-existing logic blocks, and wherein the pre-existing logic blocks were defined prior to creation of the new data field;

initiate a business process comprising the data flow by generating a new record comprising the source data table, wherein the source data table includes the new data field, and wherein the new data field stores information corresponding to the new CDA; and upon generating the new record, calling at least one logic block of the pre-existing logic blocks, wherein calling the at least one logic block includes passing the information corresponding to the new CDA to the at least one logic block, wherein the at least one logic block:

identifies that the information corresponding to the new CDA was passed to the at least one logic block; and executes at least a portion of the data flow by passing the information corresponding to the new CDA from the source data table to the destination data table.

9. The computing system of claim 8, wherein the destination data table includes the new data field for storing the information corresponding to the new CDA.

10. The computing system of claim 8, wherein the CDA definition comprises at least a name and a data type of the new CDA.

11. The computing system of claim 8, wherein associating the new data field with the source data table results in new records comprising the source data table including the new data field when the new records are created.

12. The computing system of claim 8, wherein the CDA definition was created in a no-code development environment in which new CDAs can be defined and associated with data flows.

13. The computing system of claim 8, wherein initiating the business process occurs in response to an incoming transaction that triggers the business process.

14. The computing system of claim 8, wherein the CDA definition indicates that the new CDA should appear in records comprising the destination data table.

15. One or more computer-readable storage media having program instructions stored thereon for implementing customer-defined attributes, wherein the program instructions, when read and executed by a processing system, direct the processing system to at least:

receive a customer-defined attribute (CDA) definition defining a new data field for storing a new CDA, wherein the CDA definition is received via a CDA profile that abstracts a data model of the computing system, the CDA profile identifying a source data table and a destination data table as part of a pre-defined business process;

associate the new data field with the source data table and a data flow from the source data table to the destination data table, wherein the data flow utilizes pre-existing logic blocks and wherein the pre-existing logic blocks include additional mappings logic that enables recognition and processing of the new data field without modification to the pre-existing logic blocks, and wherein the pre-existing logic blocks were defined prior to creation of the new data field;

initiate a business process comprising the data flow by generating a new record comprising the source data table, wherein the source data table includes the new data field, and wherein the new data field stores information corresponding to the new CDA; and upon generating the new record, calling at least one logic block of the pre-existing logic blocks, wherein calling the at least one logic block includes passing the information corresponding to the new CDA to the at least one logic block, wherein the at least one logic block:

identifies that the information corresponding to the new CDA was passed to the at least one logic block; and executes at least a portion of the data flow by passing the information corresponding to the new CDA from the source data table to the destination data table.

16. The one or more computer-readable storage media of claim 15, wherein the destination data table includes the new data field for storing the information corresponding to the new CDA.

17. The one or more computer-readable storage media of claim 15, wherein the CDA profile comprises at least a name and a data type of the new CDA.

18. The one or more computer-readable storage media of claim 15, wherein associating the new data field with the source data table results in new records comprising the source data table including the new data field when the new records are created.

19. The one or more computer-readable storage media of claim 15, wherein the CDA profile was created in a no-code development environment in which new CDAs can be defined and associated with data flows.

20. The one or more computer-readable storage media of claim 15, wherein initiating the business process occurs in response to an incoming transaction that triggers the business process.

* * * * *